C. W. BERNSON.
SUGAR CANE CULTIVATOR.
APPLICATION FILED APR. 28, 1916.

1,260,746.

Patented Mar. 26, 1918.
2 SHEETS—SHEET 1.

Inventor
CHARLES WILLIAM BERNSON
By his Attorney

C. W. BERNSON.
SUGAR CANE CULTIVATOR.
APPLICATION FILED APR. 28, 1916.

1,260,746.

Patented Mar. 26, 1918.
2 SHEETS—SHEET 2.

Inventor
CHARLES WILLIAM BERNSON
By his Attorney

UNITED STATES PATENT OFFICE.

CHARLES WILLIAM BERNSON, OF HABANA, CUBA.

SUGAR-CANE CULTIVATOR.

1,260,746.  Specification of Letters Patent.  Patented Mar. 26, 1918.

Application filed April 28, 1916. Serial No. 94,088.

*To all whom it may concern:*

Be it known that I, CHARLES WILLIAM BERNSON, a citizen of the United States of America, residing at 88 San Ygnacio St., in the city of Habana, Republic of Cuba, have invented new and useful Improvements in Sugar-Cane Cultivators, of which the following is a specification.

My invention relates to sugar cane cultivators.

In the cultivation of sugar cane, particularly on the island of Cuba, the cane is topped and what is cut off is thrown between the rows to form a mulsh. The part of the cane cut off is known as "trash" and is very heavy. This "trash" sometimes fills the rows of cane to a depth of several feet, so that it is possible to cultivate but comparatively small areas, by hand labor. Furthermore, unless the soil between the rows of cane is thoroughly cultivated, the cane must be replanted in a very few years. By cultivating the soil and at the same time throwing the trash on the cultivated soil to form a mulsh, the life of the cane plant is more than doubled so that frequent replanting is unnecessary.

The object of my invention is to provide an implement which will cultivate the soil and also throw the "trash" from between adjacent rows of cane onto the previously cultivated row.

Figure 1:
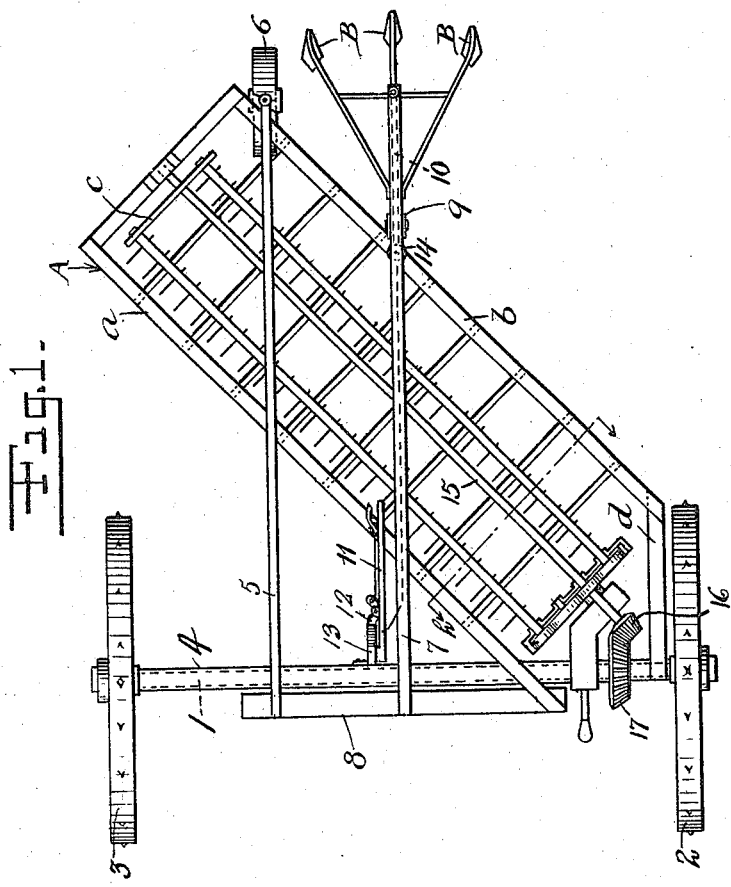
Figure 1 is a plan view of a sugar cane cultivator constructed in accordance with this invention.

Referring more particularly to the accompanying drawings, the numeral 1 indicates the axle of my improved device, upon each end of which, is rotatably mounted the ground wheels 2 and 3. A fixed sleeve 4 is provided in which the axle 1 is adapted to rotate. A frame A composed of the side members *a* and *b* and end member *c* is disposed at an angle of 45° from the plane of the axle 1. The side member *b* of said frame is attached to the sleeve 4 in any suitable manner while the side member *a* has an arm *d* attached thereto, the opposite end of said arm being secured to the sleeve 4 in the same manner as the member *b*.

Secured to the sleeve 4 is a beam 5 carrying at its free end an auxiliary wheel 6, which supports the rear end of the device.

A hollow tube 7 is also secured to the sleeve 4 and this tube extends rearwardly of the device for a purpose presently to be explained. The front ends of the beam 5, tube 7, and side member *b* of frame A are secured together by means of the cross bar 8 so that the several parts will be supported rigidly on the sleeve 4.

Attached to the side member *b* of the frame A, intermediate its length is a bracket 9 to which are pivotally attached the cultivator teeth B. One end of a chain 10 is secured to the teeth B and said chain passes through the tube 7, its opposite end being attached to a hand lever 11, provided with the pawl 12 which engages the teeth of a segment 13 secured to the sleeve 4. By this means the cultivator teeth can be raised or lowered and held in their adjusted position.

Figure 2:
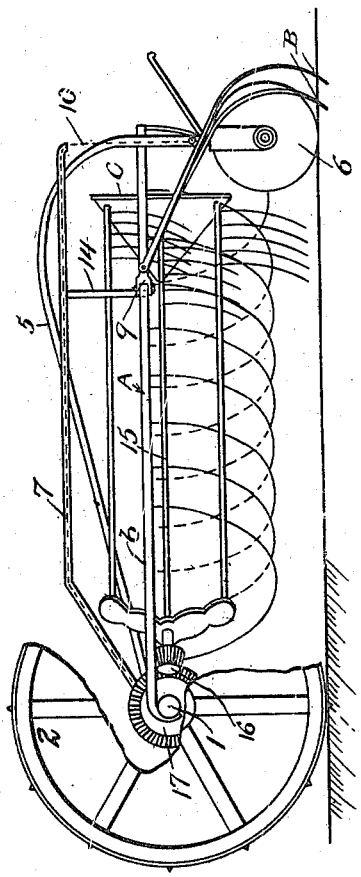
Fig. 2 is a side elevation of the same partly broken away.

Secured to the beam *b* of the frame A, adjacent the bracket 9, is an upright 14 designed to support the tube 7, as clearly shown in Fig. 2.

The frame A is adapted to support a rotary rake *c* of any suitable construction and said rake is supported at an angle of 45° whereby trash picked up thereby is thrown to the side of the device. This rake is adapted to be rotated through the instrumentality of the center rod 15 having secured to its free end a bevel gear 16 adapted to mesh with a second bevel gear 17 rigidly mounted on the shaft 1.

In the operation of my device, the same is drawn over the ground to be cultivated and the cultivator teeth engage the several rows and cultivate the dirt in the known manner. At the same time the rake is rotated to throw the "trash" from between adjacent rows onto the previously cultivated row. In this manner a very great amount of ground can be covered and a very great amount of work accomplished in a short space of time.

What I claim is:—

1. A cane cultivator comprising in combination a rotary side delivery rake and cultivator teeth pivoted to said rake, and disposed behind the same.

2. A cane cultivator comprising in combination a rotary side delivery rake, cultivator teeth pivoted to said rake and disposed behind the same, and means for raising and lowering said teeth.

3. A cane cultivator comprising in combination a rotary side delivery rake whose axis is arranged at an angle of substantially forty-five degrees with relation to the longitudinal axis of the cultivator, cultivator teeth pivoted to said rake, means for raising and lowering said teeth, and means for rotating said rake.

4. A cane cultivator comprising in combination a frame, a side delivery rake mounted to rotate in said frame, a bracket secured to said frame, cultivator teeth pivoted in said bracket and disposed behind the rake, and means for raising and lowering said teeth.

5. A cane cultivator comprising in combination, a wheeled carriage, a frame supported at its front end by said carriage, a side delivery rake mounted to rotate in said frame, cultivator teeth pivoted to said frame, and an auxiliary wheel at the rear of the frame for supporting the same in spaced relation to the ground.

6. A cane cultivator comprising in combination a frame, a side delivery rotary rake whose axis is located at an angle across the longitudinal axis of the cultivator, and cultivator teeth pivoted to said rake and disposed behind the frame.

In testimony whereof I have signed my name to this specification in the presence of two subscribing witnesses.

CHARLES WILLIAM BERNSON.

Witnesses:
L. A. CHRISTY,
RAOUL F. WASHINGTON.

Copies of this patent may be obtained for five cents each, by addressing the "Commissioner of Patents, Washington, D. C."